United States Patent [19]
Sparks et al.

[11] Patent Number: 5,704,631
[45] Date of Patent: Jan. 6, 1998

[54] END-LINK FOR AUTOMOTIVE SUSPENSION SYSTEM

[75] Inventors: Billy Sparks, Guthrie Center, Iowa; Eric Davis Ross Thompson, Mount Prospect, Ill.

[73] Assignee: Illinois Tool Works Inc., Glenview, Ill.

[21] Appl. No.: 706,000

[22] Filed: Aug. 30, 1996

[51] Int. Cl.$^6$ ............................................. B60G 21/00
[52] U.S. Cl. ........................... 280/689; 411/354; 411/907
[58] Field of Search ............................... 280/689, 673; 403/371; 411/237, 303, 354, 512, 907

[56] References Cited

U.S. PATENT DOCUMENTS

| | | | |
|---|---|---|---|
| 1,769,101 | 7/1930 | Becker | 403/371 |
| 3,164,418 | 1/1965 | Biesecker | 411/354 |
| 3,314,699 | 4/1967 | Taylor | 403/14 |
| 3,579,942 | 5/1971 | Cole | 411/959 |
| 4,778,321 | 10/1988 | Okawa | 411/546 |
| 4,944,523 | 7/1990 | Hardy, Jr. et al. | 280/689 |
| 5,449,193 | 9/1995 | Rivard et al. | 280/689 |

*Primary Examiner*—Paul N. Dickson
*Attorney, Agent, or Firm*—Trexler, Bushnell, Giangiorgi & Blackstone, Ltd.

[57] ABSTRACT

An improved end-link for a suspension system for a motor vehicle, such as an automobile or a light truck, is used to accommodate adjustment between first and second elements, such as a stabilizer bar and a control element, in the suspension system. The end-link includes a connecting member which has an unthreaded portion of a predetermined diameter and a threaded end portion; a first washer; first and second grommet members for engaging top and bottom surfaces, respectively, of the first element; an end cap for engagement with the second grommet; a sleeve for engagement with the end cap and for engagement with a third grommet that grips the top surface of the control element; a fourth grommet for engaging the bottom surface of the control element and a second washer. The sleeve has an extension thereon which is formed from a plurality of arcuate protrusions for gripping the unthreaded shank portion of the connecting member when assembled with the bolt and the third grommet and for preventing substantial relative axial movement between the sleeve, the third grommet and the connecting member. This prevents the sleeve and the associated components from slipping off of the bolt. The second grommet, the end cap, the sleeve and the third grommet may be provided as a subassembly.

11 Claims, 3 Drawing Sheets

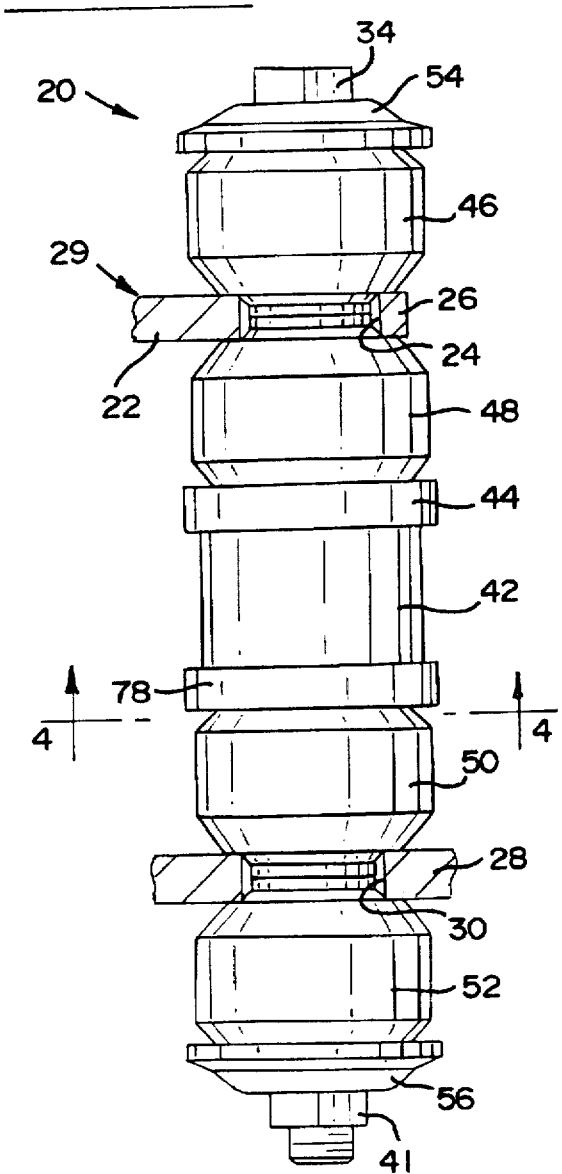
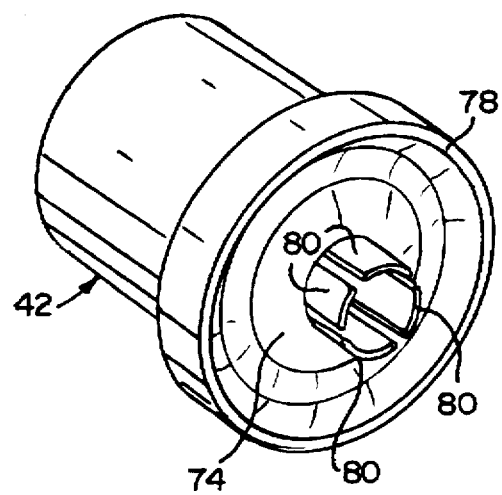
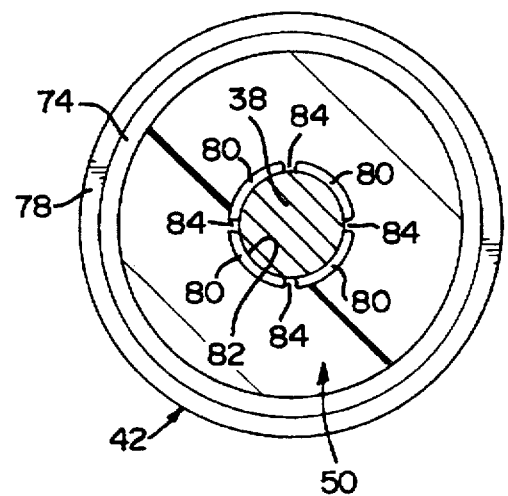

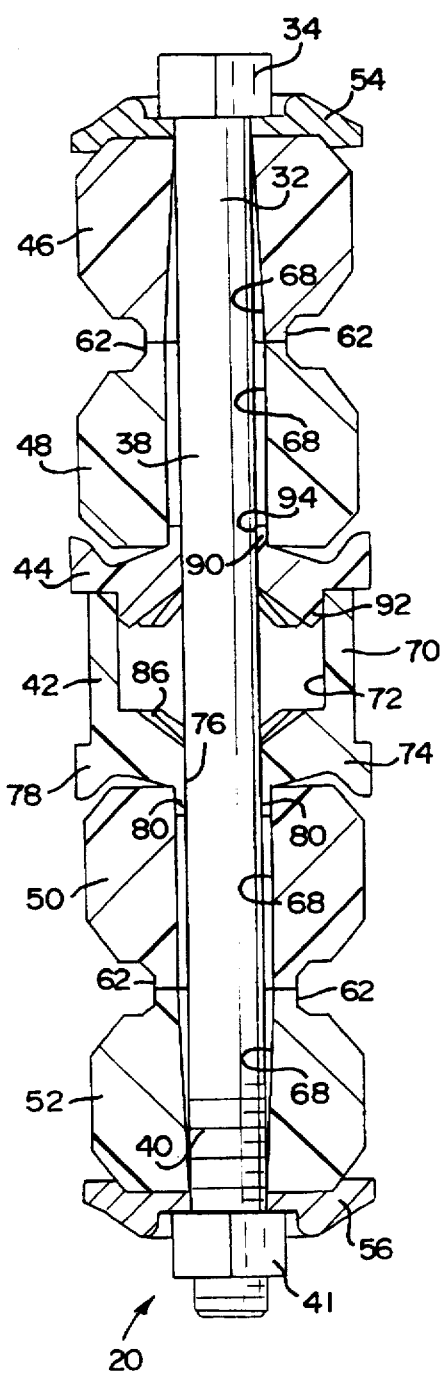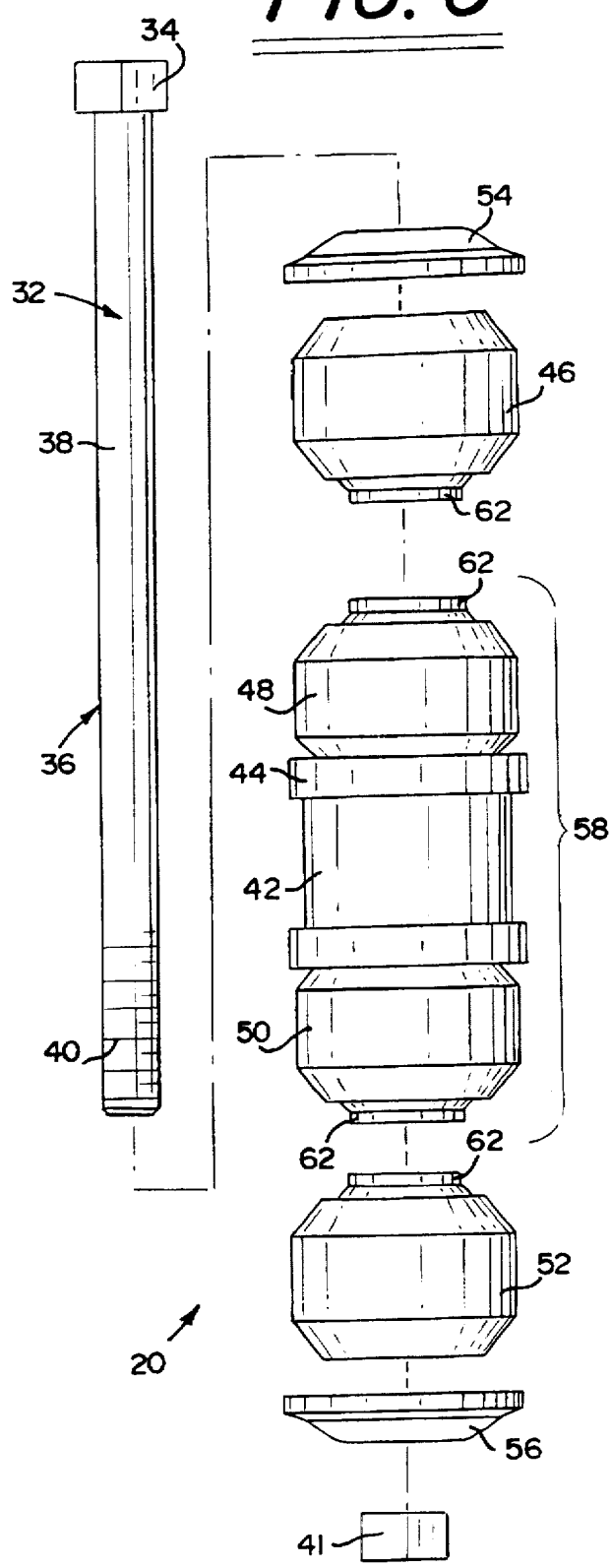

END-LINK FOR AUTOMOTIVE SUSPENSION SYSTEM

BACKGROUND OF THE INVENTION

This invention is generally directed to an improved end-link for use in a suspension system for a vehicle, such as an automobile or a light truck. More particularly, the present invention is directed to an improved end-link which is easy to assemble with the suspension system.

Suspension systems of the type contemplated herein usually include a stabilizer bar, a control element, and an end-link connecting an end of the stabilizer bar with the control element so as to transmit forces therebetween. These end-links have included pairs of grommets which embrace the stabilizer bar and the control element, respectively, a connecting bolt extending through the grommets, and a spacer mounted on an intermediate portion of the bolt between the innermost grommets for spacing the stabilizer bar and the control element. The grommets include an axial passageway therethrough to allow the grommets to move relative to the rod. A suspension system and end-link of the abovedescribed type are disclosed in U.S. Pat. Nos. 4,944,523 and 5,449,193 which are commonly owned by the assignee herein.

While these types of end-links are effective, they are often difficult to assemble with the stabilizer system because of the many components and/or subassemblies which must be held during assembly. The present invention is intended to overcome this problem as well as to present several other improvements over prior art end-links.

OBJECTS AND SUMMARY OF THE INVENTION

An object of the present invention is to provide an improved novel end-link for use in a suspension system, wherein the end-link includes a connecting member, first and second grommets for engaging a first element of the suspension system, an end cap connected to the second grommet, a sleeve having an end connected to the end cap and the other end engaged with a third grommet that engages a second element of the suspension system, and a fourth grommet which engages the opposite side of the second element, wherein the sleeve includes a plurality of finger-like protrusions which, in combination with the third grommet, maintain the engagement of the second grommet, end cap, sleeve and third grommet with the connecting member so that the end-link is easily assembled with the suspension system.

Another object of the present invention is to provide an improved end-link assembly which can be turned upside-down on a connecting member, such as a bolt, without slipping off of the connecting member.

Yet another object of the present invention is to provide an improved end-link assembly with which substantial relative axial movement between the connecting member and the sleeve/grommet combination is prevented by a radial, resilient collapsible extension provided on the sleeve.

A further object of the present invention is to provide the second grommet, the end cap, the sleeve and the fourth grommet as a subassembly which can be assembled and then placed on the connecting member.

Briefly, and in accordance with the foregoing, the present invention discloses an improved end-link for a suspension system for a motor vehicle, such as an automobile or a light truck, for accommodating adjustment between first and second elements, such as a stabilizer bar and a control element, in the suspension system. The end-link includes a connecting member, such as a bolt, which has an unthreaded portion of a predetermined diameter and a threaded end portion; a first washer; first and second grommet members for engaging top and bottom surfaces, respectively, of the first element; an end cap for engagement with the second grommet; a sleeve for engagement with the end cap and for engagement with a third grommet that engages the top surface of the control element; a fourth grommet for engaging the bottom surface of the control element and a second washer. The sleeve has an extension thereon which is formed from a plurality of arcuate protrusions for gripping the shank portion of the connecting member when assembled with the shank portion and the third grommet and for preventing substantial relative axial movement between the sleeve, the third grommet and the connecting member. This prevents the sleeve and the associated components from slipping off of the connecting member. The second grommet, the end cap, the sleeve and the third grommet may be provided as a subassembly.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is an elevational view of an end-link which incorporates the features of the invention, as combined with a stabilizer bar and a control element, which are components in an automotive suspension system and are shown fragmentarily in cross-section;

FIG. 3 is a perspective view of a sleeve which is a component of the end-link of the present invention;

FIG. 4 is a cross-sectional view of the end-link along line 4—4 in FIG. 1;

FIG. 5 is a cross-sectional view of the end-link with a connecting bolt and nut shown in elevation; and FIG. 6 is a partially exploded view of the end-link with a subassembly, which forms part of the end-link, assembled.

DETAILED DESCRIPTION OF THE PREFERRED EMBODIMENT

Figure 2:
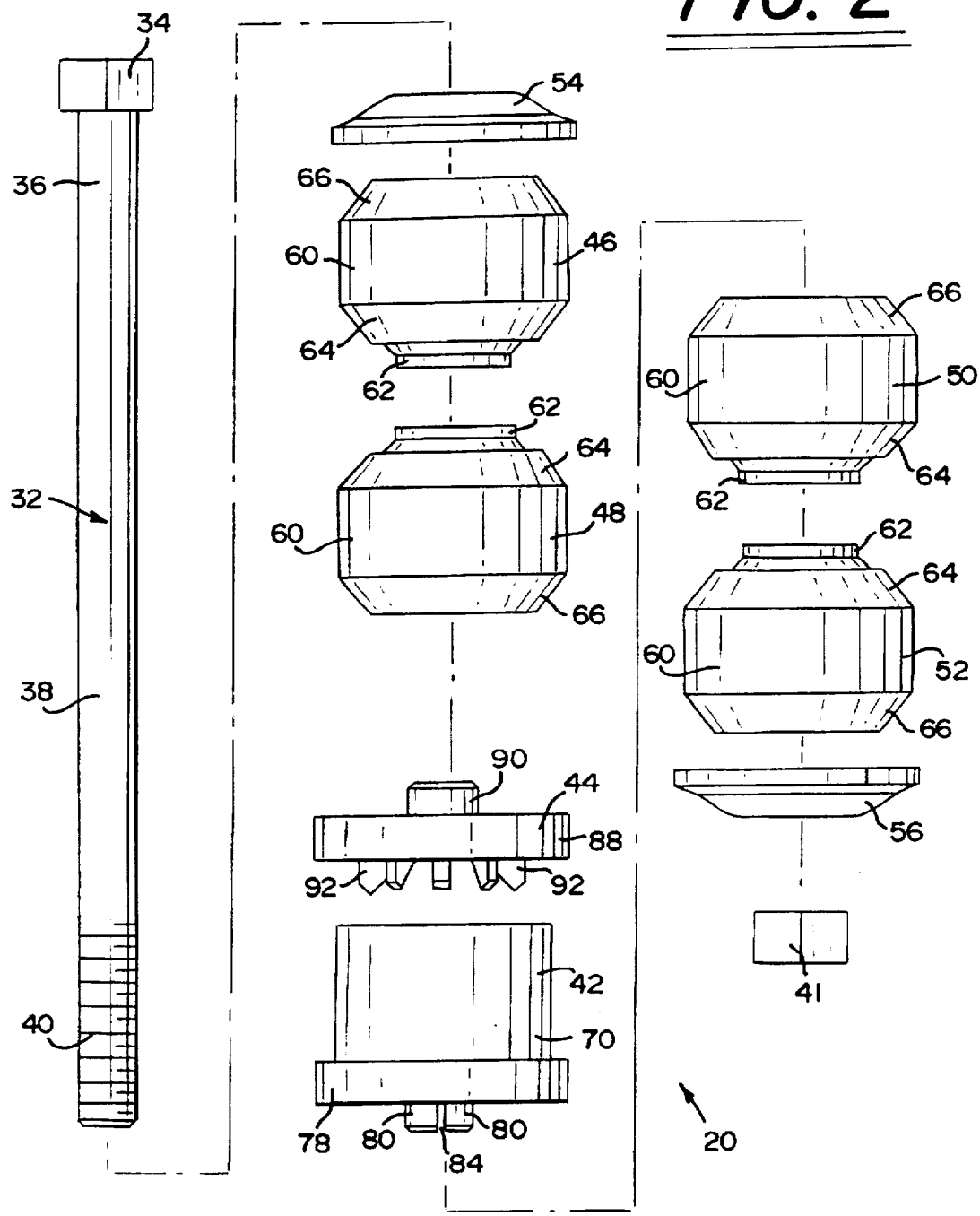
FIG. 2 is an exploded view of the end-link of FIG. 1 without the stabilizer bar and a control element.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

An end-link 20, as shown in FIG. 1, is adapted to be assembled with first and second elements, for example, a torsion or stabilizer bar 22 and an axle housing bracket or control element 28, of a vehicle suspension system 29 of known construction for a motor vehicle, such as an automobile or a light truck. The stabilizer bar 22 has a circular aperture 24 therethrough near one end 26 thereof, and the control element 28 also has a circular aperture 30 therethrough. Typically, the thickness of the stabilizer bar 22 at the margin of the aperture 24 and the thickness of the control element 28 at the margin of the aperture 30 are approximately equal.

The end-link 20 includes a steel bolt 32, which has a head 34 and a shank 36. The shank 36 of the bolt 32 has an unthreaded portion 38 which has a predetermined diameter and a threaded end portion 40. A steel nut 41 is placed on the threaded end portion 40 as described herein. The end-link 20 further includes a sleeve 42 and an end cap 44 which engages with the sleeve 42; first, second, third and fourth annular grommets 46, 48, 50, 52, respectively, and first and second annular steel washers 56, 58, respectively. The second grommet 48, the end cap 44, the sleeve 42 and the third grommet 50 can be assembled to form a subassembly 58, as shown in FIG. 6 and as assembled as described herein, prior to being placed on the bolt 32.

Each of the grommets 46, 48, 50, 52 of the end-link 20 is molded of an elastomeric material, such as a natural or synthetic rubber. Each conforms in shape to the other grommets of the end-link 20 and has an annular body 60 and a tubular extension 62 connected to a beveled or chamfered portion 64 of the annular body 60 at a first end. The second end of the annular body 60 of each grommet 46, 48, 50, 52 also has a beveled or chamfered portion 66. A passageway 68 is provided through each grommet 46, 48, 50, 52 and slightly tapers from the first end of each grommet 46, 48, 50, 52 to the second end of each grommet 46, 48, 50, 52. Prior to assembling the grommets 46, 48, 50, 52 in the end-link assembly, the diameter of the passageway 68 at the first end is greater than the diameter of the unthreaded shank portion 38 of the bolt 32, i.e. the end of each grommet 46, 48, 50, 52 which has the tubular extension 62 thereon, and the diameter of the passageway 68 at the second end of each grommet 46, 48, 50, 52 is approximately the same as the diameter of the unthreaded shank portion 38 of the bolt 32, i.e. the end of each grommet 46, 48, 50, 52 which does not have the tubular extension 62 thereon.

As best illustrated in FIG. 3, the sleeve 42 has a tubular body 70 which is molded from a suitable polymer material. The interior of the tubular body 70 is provided with an annular passageway 72 having a predetermined diameter and length that is defined by an inner surface. One end of the tubular body 70 is substantially closed by an end portion 74 integrally molded therewith and the other end of the tubular body 70 is substantially closed by the end cap 44 which is molded separately from the sleeve 42 and is thereafter connected thereto as described herein.

The end portion 74 of the sleeve 42 is annular so as to completely close the end of the sleeve 42 with the exception of an aperture 76 provided therethrough. An annular flange 78 is integrally molded with the sleeve 42 and protrudes outwardly from the end portion 74 and from the tubular body 70. As best shown in FIGS. 4 and 5, a tubular, resiliently, radially collapsible extension, which includes a plurality of finger-like or finger protrusions 80, extend outwardly from outer surface of the end portion 74 and define a circular aperture 82 therein. Each finger-like protrusion 80 is arcuate in shape and is spaced from the next by a slot 84. The inside diameter of the aperture 82 defined by the finger-like protrusions 80 is approximately the same as the diameter of the unthreaded shank portion 38 of the bolt 32 and the outside diameter defined by the finger-like protrusions 80 is slightly greater than the diameter of the passageway 72 provided through the third grommet 50 at its first end.

The inner surface of the end portion 74 has a plurality of radial ribs 86 integrally molded thereon which commence at the aperture 76 and extend outwardly therefrom. Each rib 86 is generally beveled from the aperture 76 to the aperture wall. The ribs 86 provide reinforcement of the end portion 74.

The end cap 44 which substantially closes the second end of the sleeve 42 when connected thereto, as described in detail herein, is molded from a suitable polymer material, which may be the same material as the sleeve 42. As best illustrated in FIG. 2, the end cap 44 has an annular body 88 which has an annular extension 90 which protrudes from an upper surface of the body 88 and a plurality of ribs 92 which extend from lower surface of the body 88. Such an end cap is disclosed in U.S. Pat. No. 5,449,193 which disclosure is herein incorporated by reference and which is commonly owned by the assignee herein.

The body 88 and the annular extension 90 have an aperture 94 therethrough which has a diameter that is slightly greater than the diameter of the unthreaded shank portion 38 of the bolt 32. The outside diameter of the annular extension 90 is slightly greater than the diameter of the passageway 68 through the second grommet 48 at its second end.

The ribs 92 on the lower surface of the body 88 extend radially outwardly from the aperture 94 a predetermined distance and are spaced apart from each other. The ribs 92 end a predetermined distance from the edge of the lower surface of the end cap 44. Each rib 92 is generally shaped as a right triangle with the hypotenuse of the triangle starting at the aperture 94 and extending downwardly and outwardly from the lower surface of the end cap 44, one a leg being integrally joined with the lower surface of the end cap 44 and the other leg being at a right angle to the lower surface of the end cap 44 and being the outermost extent of each protrusion 92. The diameter between the outermost leg on opposite ribs 92 is slightly greater than the diameter of the passageway 72 in the tubular sleeve body 70. Each rib 92 has a beveled edge between the hypotenuse and the outermost leg. The radial ribs 92 serve two functions. First, the ribs 92 provide reinforcement of the end cap 44. Second, the ribs 92 connect the end cap 44 to the sleeve 42.

To connect the end cap 44 to the sleeve 42, the ribs 92 are inserted into the passageway 72 within the tubular sleeve body 70 and each outermost leg tightly engages the inner surface of the passageway wall. The beveled edge of each rib 92 aids in initially positioning and connecting the ribs 92 and the tubular body 70 together. Once engaged, the ribs 92 and the tubular body 70 are held together by friction.

Now that the specifics of the end-link 20 has been described, the assembly of the end-link 20 with the suspension system 29 is described.

The end-link 20 is assembled with the suspension system 29 by extending the bolt shank 36 successively through the first washer 56, the first grommet 46 and the second grommet 48, the end cap 44 and the sleeve 42, the third grommet 50 and the fourth grommet 52, and the second washer 56, and threading the nut 41 onto the threaded end portion 40 of the bolt shank 36. Each grommet 46, 48, 50, 52 must be axially oriented such that the tubular extensions 62 of grommets 46 and 48 face each other and such that the tubular extensions 62 of grommets 50 and 52 face each other.

The second grommet 48 is assembled with the end cap 44 by inserting the annular extension 90 on the upper surface of the end cap 44 into the first end of the grommet passageway 68. Because the annular extension 90 has an outer diameter which is greater than the inner diameter of the passageway 68 in the second grommet 48 at its first end, the second grommet 48 and the end cap 44 are securely engaged together. The insertion of the annular extension 90 into the end of the passageway 68 causes the passageway 68 to generally straighten. The end cap 44 and the sleeve 42 are assembled together as described hereinabove by inserting the radial ribs 92 into the tubular body 70. The third grommet 50 is assembled with the sleeve 42 by inserting the finger-like protrusions 80 into the second end of the passageway 68 through the third grommet 50. Because the finger-like protrusions 80 define an outer diameter which is slightly greater than the inner diameter of the passageway 68 in the third grommet 50, the third grommet 50 and the sleeve 42 are securely engaged together. In addition, the engagement of the finger-like protrusions 80 within the third grommet 50 causes the resilient finger-like protrusions 80 to compress inwardly because the passageway 68 through the grommet 50 has a diameter which is less than the outer diameter of the protrusions 80. Therefore, when the third grommet 50 is placed over the protrusions 80, the finger-like protrusions 80 squeeze or grip the unthreaded shank portion 38 to prevent substantial relative axial movement between the sleeve 42 and third grommet 50 combination and the unthreaded shank portion 38.

Each of the apertures 24, 30 formed in the stabilizer bar 22 and the control element 28, respectively, has a diameter smaller than the outer diameter of the grommets 46, 48, 50, 52, except at the tubular extensions 62, which are adapted to fit axially into the apertures 24, 30. Each of the tubular extensions 62 has an axial length not greater than one-half of the thickness of the stabilizer bar 22 at the margin of the aperture 24 and not greater than one-half of the thickness of the control element 28 at the margin of the aperture 30.

The end-link 20 is connected to the stabilizer bar 22 and to the control element 28, as the end-link 20 is assembled, by causing the tubular extension 62 of the first grommet 46 and the tubular extension 62 of the second grommet 48 to extend axially, from opposite directions, into the aperture 24 formed into the stabilizer bar 22, as the bolt shank 36 is extended through the first grommet 46 and the second grommet 48, and causing the tubular extension 62 of the third grommet 50 and the tubular extension 62 of the fourth grommet 52 to extend axially, from opposite directions, into the aperture 30 formed in the control element 28, as the bolt shank 36 is extended through the third grommet 50 and the fourth grommet 52. The first grommet 46 engages the top surface of the stabilizer bar 22 and the second grommet 48 engages the bottom surface of the stabilizer bar 22. The third grommet 50 engages the top surface of the control element 28 and the fourth grommet 52 engages the bottom surface of the control element 28.

Because the finger-like protrusions 80 on the sleeve 42 maintain the assembly of the first washer 54, the first and second grommets 46, 48, the end cap 44 and the sleeve 42 on the bolt shank 36, assembly of the end-link 20 and connection of the end-link 20 to the stabilizer bar 22 and the Control element 28, as described above, is simplified over prior art assemblies wherein all of the components of the end-link are separately assembled. The improvement of the addition of the finger-like protrusions 80 to the sleeve 42 also enables a worker to easily handle the end-link 20 and hold the end-link 20 upside-down without the components of the end-link 20 sliding off of the bolt 32.

Alternatively, prior to installation of the components on the bolt 32, the sleeve 42 and end cap 44 may first be assembled, the second grommet 48 then assembled with the end cap 44 and the third grommet 50 assembled with the sleeve 42 to provide the subassembly 58. The end cap 44 and the sleeve 42 are assembled together as described hereinabove. The second grommet 48 is assembled with the end cap 44 by inserting the annular extension 90 on the upper surface of the end cap 44 into the first end of the grommet passageway 68 as described herein. The third grommet 50 is assembled with the sleeve 42 by inserting the finger-like protrusions 80 into the second end of the passageway 68 through the third grommet 50. In addition, the engagement of the finger-like protrusions 80 within the third grommet 50 cause the resilient finger-like protrusions 80 to compress inwardly and lessen the inside diameter of the aperture 82 provided by finger-like protrusions 80 such that the inside diameter of the aperture 82 is now slightly less than the diameter of the unthreaded shank portion 38 of the bolt 32. Therefore, when the subassembly 58 is placed on the bolt 32, the finger-like protrusions 80 are expanded sufficiently outwardly, because of the resilient nature of the grommet 50 and the finger-like protrusions 80, to allow the unthreaded shank portion 38 of the bolt 32 to pass therethrough, but the finger-like protrusions 80 also squeeze or grip the unthreaded shank portion 38 to prevent substantial relative axial movement between the subassembly 58 and the unthreaded shank portion 38, and more specifically, prevent substantial relative axial movement between the sleeve 42 and third grommet 50 combination and the unthreaded shank portion 38.

It is envisioned that the aperture 82 defined by the finger-like protrusions 80 may be made slightly smaller than the diameter of the unthreaded shank portion 38 of the bolt 32 such that the finger-like protrusions 80 squeeze or grip the unthreaded shank portion 38 without the use of the third grommet 50. Because the finger-like protrusions 80 are formed from a polymer material that can be flexed, the finger-like protrusions 80 will expand to allow the unthreaded shank portion 38 to pass therethrough, but will frictionally grip the unthreaded shank portion 38 to prevent relative axial movement between the sleeve 42 and the bolt 32.

It is to be understood that herein, such terms as "upper", "lower", "above" and "below" are intended to refer to a convenient orientation of the end-link 20, as shown, but are not intended to limit the end-link 20 to any specific orientation.

While a preferred embodiment of the present invention is shown and described, it is envisioned that those skilled in the art may devise various modifications of the present invention without departing from the spirit and scope of the appended claims.

The invention claimed is:

1. An end-link for a suspension system for a motor vehicle for accommodating adjustment between first and second elements, comprising:

a connecting member including a shank;

first means on said shank for embracing said first element;

second means on said shank for embracing said second element; and a sleeve on said shank between said first and said second means, said sleeve including a substantially closed end and a tubular, resiliently, radially collapsible extension extending from said end, one of said first and second means engaging and collapsing said extension for gripping said shank of said connecting member when placed thereover and preventing substantial relative axial movement between said sleeve and said connecting member.

2. An end-link as defined in claim 1, wherein said tubular, resiliently, radially collapsible extension comprises a plurality of finger protrusions spaced apart from each other by slots, said finger protrusions defining an aperture through which said shank of said connecting member is inserted.

3. An end-link as defined in claim 2, wherein said means which engages said extension comprises a grommet having an inner wall defining a passageway therethrough having a predetermined diameter; and said finger protrusions define an outer diameter which is greater than the diameter of said passageway in said grommet such that when said finger protrusions are engaged within said passageway in said grommet, said finger protrusions compress inwardly to grip said shank of said connecting member.

4. An end-link as defined in claim 3, wherein said shank of said connecting member has a predetermined diameter; and said finger protrusions define an inside diameter which is initially approximately the same as the diameter of said shank.

5. An end-link as defined in claim 1, further including an end cap for closing an end of said sleeve opposite said substantially closed end.

6. An end-link as defined in claim 1, wherein said first means comprises a pair of grommets and said second means comprises a pair of grommets.

7. An end-link for a suspension system for a motor vehicle for accommodating adjustment between first and second elements, comprising:

a connecting member having a shank of a predetermined diameter;

a first grommet member for engaging an upper surface of said first element;

a subassembly for gripping said shank of said connecting member, said subassembly including a sleeve having substantially closed first and second ends, one of said ends of said sleeve having a tubular, resiliently radially collapsible extension thereon, a second grommet connected to said first end of said sleeve and for engagement against a lower surface of said first element, and a third grommet connected to said second end of said sleeve and for engagement against an upper surface of said second element, one of said second and third grommets engaging and collapsing said extension for gripping said shank of said connecting member when assembled therewith and for preventing substantial relative axial movement between said sleeve and said connecting member; and a fourth grommet for engaging a lower surface of said second element.

8. An end-link as defined in claim 7, wherein said extension comprises a plurality of finger protrusions spaced apart from each other by slots, said finger protrusions defining an aperture through which said shank of said connecting member is inserted.

9. An end-link as defined in claim 8, wherein said one grommet which engages and collapses said extension has an inner wall defining a passageway therethrough having a predetermined diameter for engagement of said finger protrusions on said sleeve therein; and said finger protrusions define an outer diameter which is greater than the diameter of said passageway such that when said finger protrusions are engaged within said passageway, said finger protrusions compress inwardly to grip said shank of said connecting member.

10. An end-link as defined in claim 9, wherein said finger protrusions define an inside diameter which is initially approximately the same as the diameter of said shank.

11. An end-link as defined in claim 7, wherein said subassembly further includes an end cap for closing said first end of said sleeve and for engagement with the other of said second and third grommets.

* * * * *